(12) United States Patent
Korsten

(10) Patent No.: US 9,416,324 B2
(45) Date of Patent: Aug. 16, 2016

(54) CROSS FLOW GAS-LIQUID CATALYTIC REACTION SYSTEMS

(71) Applicant: ExxonMobil Research and Engineering Company, Annandale, NJ (US)

(72) Inventor: Hans G. Korsten, Fairfax, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 368 days.

(21) Appl. No.: 13/926,413

(22) Filed: Jun. 25, 2013

(65) Prior Publication Data

US 2014/0001095 A1 Jan. 2, 2014

Related U.S. Application Data

(60) Provisional application No. 61/665,371, filed on Jun. 28, 2012.

(51) Int. Cl.
*C10G 45/00* (2006.01)
*C10G 45/72* (2006.01)
(Continued)

(52) U.S. Cl.
CPC ............... *C10G 65/12* (2013.01); *B01J 8/008* (2013.01); *B01J 8/025* (2013.01); *B01J 8/0214* (2013.01); *B01J 8/0221* (2013.01); *B01J 8/0257* (2013.01); *B01J 8/0278* (2013.01); *B01J 8/043* (2013.01); *B01J 8/048* (2013.01); *B01J 8/0415* (2013.01); *B01J 8/0453* (2013.01); *B01J 8/0469* (2013.01); *B01J 8/0492* (2013.01); *C10G 45/00* (2013.01);
(Continued)

(58) Field of Classification Search
CPC ............. B01J 2208/00884; B01J 2208/00893; B01J 8/008; B01J 8/0214; B01J 8/0221; B01J 8/025; B01J 8/0257; B01J 8/0278; B01J 8/0415; B01J 8/043; B01J 8/0453; B01J 8/0469; B01J 8/048; B01J 8/0492
See application file for complete search history.

(56) References Cited

U.S. PATENT DOCUMENTS 3,016,346 A    1/1962   O'Hara
3,844,936 A * 10/1974   Newson ........................ 208/108
(Continued)

FOREIGN PATENT DOCUMENTS

| EP | 0940172 A1 | 8/1999 |
| GB | 1219613 A | 1/1971 |
| WO | 2012082969 A1 | 6/2012 |

OTHER PUBLICATIONS

Balachandran, U., Hydrogen Separation by Dense Cermet Membranes, 2006, Fuel, vol. 80, p. 150-155.*

(Continued)

*Primary Examiner* — Renee E Robinson
*Assistant Examiner* — Derek Mueller
(74) *Attorney, Agent, or Firm* — Larry E. Carter; Chad A. Guice; David M. Weisberg

(57) ABSTRACT

A gas-liquid catalyzed reaction is performed by introducing at least a portion of the reactive gas into the catalyst as a cross-flow or radial-flow stream. Introducing at least a portion of the reactive gas as a radial flow stream allows the reactive gas to travel through the catalyst bed along a shorter path length. This reduces the pressure drop for the radial flow portion of the gas. The reactive gas can be introduced into the catalyst bed at various heights relative to the height of the catalyst bed.

31 Claims, 9 Drawing Sheets

(51) Int. Cl.

| | |
|---|---|
| *C10G 65/12* | (2006.01) |
| *B01J 8/04* | (2006.01) |
| *B01J 8/00* | (2006.01) |
| *B01J 8/02* | (2006.01) |
| *C10G 45/10* | (2006.01) |
| *C10G 47/14* | (2006.01) |
| *C10G 49/00* | (2006.01) |

(52) U.S. Cl.
CPC ............... *C10G 45/10* (2013.01); *C10G 47/14* (2013.01); *C10G 49/002* (2013.01); *B01J 2208/00884* (2013.01); *B01J 2208/00893* (2013.01)

(56) References Cited

U.S. PATENT DOCUMENTS

| | | | |
|---|---|---|---|
| 4,405,562 A | 9/1983 | Zardi et al. | |
| 4,568,524 A | 2/1986 | Pelrine | |
| 4,705,621 A | 11/1987 | Penick | |
| 4,755,279 A * | 7/1988 | Unmuth et al. | 208/87 |
| 5,730,860 A | 3/1998 | Irvine | |
| 5,759,242 A | 6/1998 | Smolarek et al. | |
| 7,128,775 B2 | 10/2006 | Celik et al. | |
| 7,271,303 B1 | 9/2007 | Sechrist et al. | |
| 7,771,677 B2 | 8/2010 | Ward | |
| 7,829,038 B2 | 11/2010 | Vetter et al. | |
| 2012/0079938 A1 | 4/2012 | Celik et al. | |

OTHER PUBLICATIONS

Hara, S., et al., An Amorphous Alloy Membrane without Nobel Metals for Gaseous Hydrogen Separation, 2000, Journal of Membrane Science, vol. 164, pp. 289-294.*

The International Search Report and Written Opinion of PCT/US2013/047864 dated Oct. 2, 2013.

* cited by examiner

US 9,416,324 B2

CROSS FLOW GAS-LIQUID CATALYTIC REACTION SYSTEMS

CROSS-REFERENCE TO RELATED APPLICATIONS

This application claims priority to U.S. Provisional Application Ser. No. 61/665,371 filed Jun. 28, 2012, which is herein incorporated by reference in its entirety.

FIELD OF THE INVENTION

This invention relates to methods and structures for catalytic processing of feeds within a reactor, such as hydroprocessing.

BACKGROUND OF THE INVENTION

Fixed bed reactors are used for a variety of reactions, such as various types of hydroprocessing of petroleum feeds. In a typical fixed bed reactor, a liquid feed and a reactive gas, such as hydrogen, are passed through a reactor along the axial direction of the reactor. Optionally, the flow of reactive gas can be counter-current to the flow of liquid along the axial direction.

For catalyzed reactions of gas phase feeds, another type of reactor that can be used is a radial flow reactor. In a radial flow reactor, one or more gases are contacted with a catalyst or adsorbent while flowing in a primarily radial direction. Before and/or after finishing contact with the catalyst or adsorbent, the gases may travel along the axial direction in order to enter or exit the reactor.

U.S. Pat. No. 4,405,562 describes a reactor for performing gas phase catalyzed reactions. A gas is introduced into at least one catalyst bed in a reactor where gasses can enter both axially and radially into the catalyst bed. All of the gas eventually flows in a radial direction in order to exit the catalyst bed, such as via a central exit conduit in the bed.

U.S. Pat. No. 7,829,038 describes a segmented outer catalyst screen for stacked radial flow reactors. A plurality of supports extend out perpendicular from the reactor wall. Screens are attached to adjacent supports to define a catalyst retention area inside the screens and fluid flow channels outside of the screens. An inner central conduit is perforated to allow for distribution of gas into the fluid flow channels.

U.S. Pat. No. 7,271,303 describes a multi-zone process for the production of diesel and aromatic compounds. A hydrocarbonaceous feedstock containing aromatics is hydrocracked to form diesel fuel and xylenes. A naphtha boiling range or lighter side product generated during the hydrocracking can be vaporized and then reformed and/or transalkylated. A radial flow reactor is described as one option for performing the reforming or transalkylation.

SUMMARY OF THE INVENTION

In an aspect, a method is provided for performing a catalyzed gas-liquid reaction. The method includes providing a first catalyst bed in a reactor, the reactor including an inner conduit that occupies a portion of the volume of the first catalyst bed and an outer gap between the catalyst bed and a wall of the reactor; exposing an axial flow of feedstock to a first catalyst in the first catalyst bed under effective processing conditions to produce a reaction effluent; and delivering at least a portion of the reactive gas flow for the exposing of the feedstock to the first catalyst under effective processing conditions as a radial gas flow, the reactive gas being introduced via the inner conduit, wherein at least about 50% of the radial gas flow volume exits the first catalyst bed by passing into the outer gap.

In another aspect, a method is provided for performing a catalyzed gas-liquid reaction. The method includes providing a first catalyst bed in a reactor, the reactor including an inner conduit that occupies a portion of the volume of the first catalyst bed and an outer gap between the catalyst bed and a wall of the reactor; exposing an axial flow of feedstock to a first catalyst in the first catalyst bed under effective processing conditions to produce a reaction effluent; and delivering at least a portion of the reactive gas flow for the exposing of the feedstock to the first catalyst under effective processing conditions as a radial gas flow, the reactive gas being introduced via the outer gap, wherein at least about 50% of the radial gas flow volume exits the first catalyst bed by passing into the inner conduit.

In still another aspect, a method is provided for performing a catalyzed gas-liquid reaction. The method includes providing a first catalyst bed in a reactor, the reactor including an inner conduit that occupies a portion of the volume of the first catalyst bed and an outer gap between the catalyst bed and a wall of the reactor; providing a second catalyst bed in a reactor, the second catalyst bed being at least partially supported by the inner conduit; exposing an axial flow of feedstock to a second catalyst in the second catalyst bed under second effective processing conditions to produce an intermediate effluent; exposing an axial flow of the intermediate effluent to a first catalyst in the first catalyst bed under effective processing conditions to produce a reaction effluent; and delivering at least a portion of the reactive gas flow for the exposing of the feedstock to the first catalyst under effective processing conditions as a radial gas flow, the reactive gas being introduced via the inner conduit or the outer gap, wherein at least about 50% of the radial gas flow volume exits the first catalyst bed by passing into the outer gap or the inner conduit.

DETAILED DESCRIPTION OF THE PREFERRED EMBODIMENTS

Figure 1:
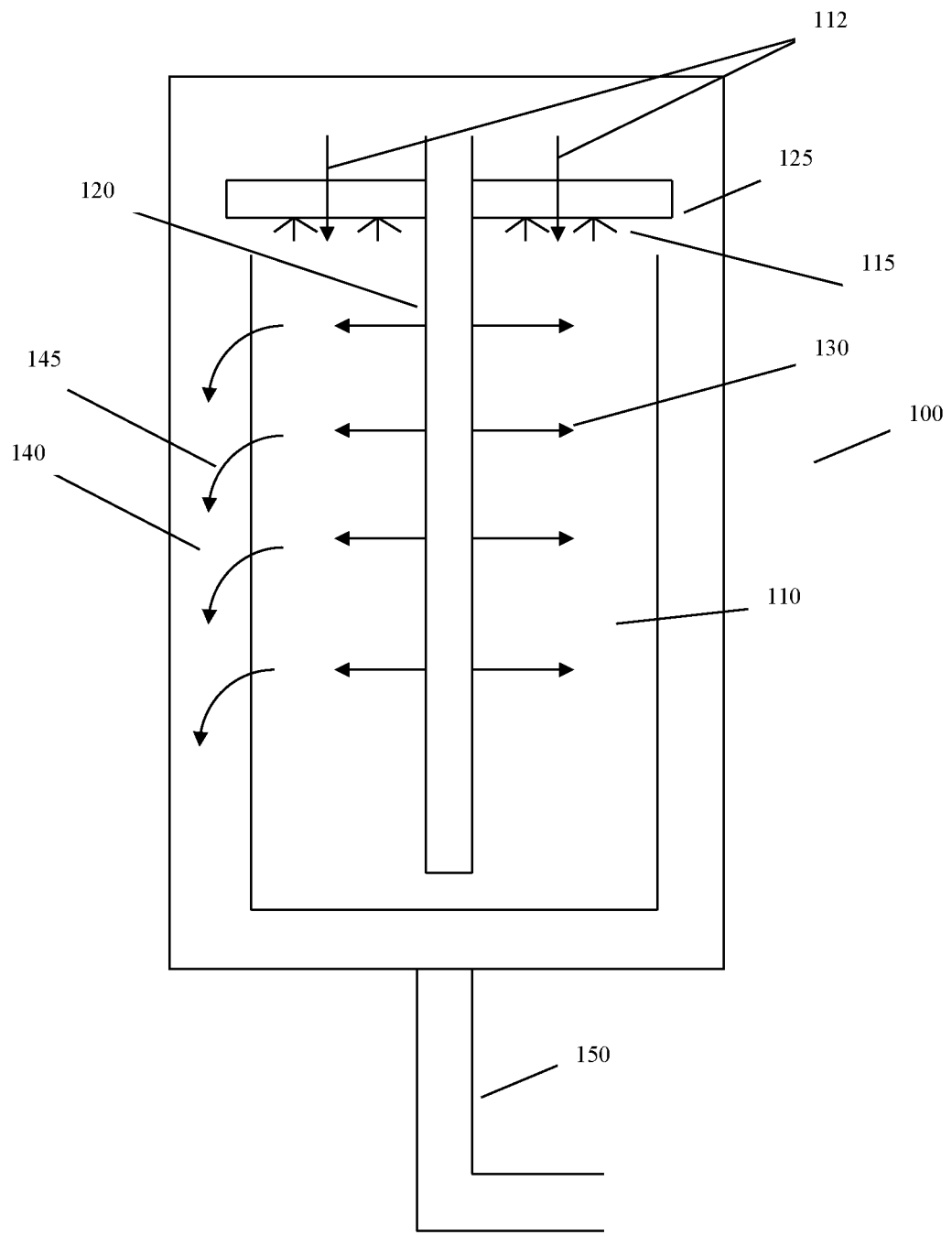
FIG. 1 schematically shows an example of radial gas flow in a reactor performing a gas-liquid catalyzed reaction.

Axial flow reactors containing one or more fixed beds of catalyst can be used for a variety of reactions, including various types of hydroprocessing reactions. Such fixed bed reactors have several properties that may pose problems during some types of reactions. One potential difficulty is the pressure drop caused by passing the liquid feedstock and a reactive gas through the catalyst bed in a co-current manner.

For example, in a hydroprocessing reaction, the pressure drop across the catalyst bed results in the lowest concentration of hydrogen at the bottom of the bed. However, the bottom of the catalyst bed is also the location where the highest concentration of contaminants released during the reaction is likely to be present. This can reduce the effectiveness of the lower portion of the catalyst bed for performing the desired reaction. Passing the reactive gas through the reactor as a counter-current flow can mitigate this problem, but counter-current reactors present their own difficulties in maintaining a stable operation and flow regime.

Typically, the reactor containing the catalyst beds is essentially cylindrical in shape and the "axial flow" (as term as used herein) is in a direction parallel with the central axis of the cylinder and the "radial flow" (as term is used herein) is in any direction that is perpendicular to the central axis.

In various aspects, the problems associated with co-current operation of an axial flow reactor can be addressed by introducing at least a portion of the reactive gas into a catalyst as a cross-flow or radial-flow stream. A typical catalyst bed can have a catalyst depth of about 20 feet (6.1 m) to 40 feet (12.2 m), with some beds having still larger depths. By contrast, the radius of a reactor is typically 15 feet (4.6 m) or less. Introducing at least a portion of the reactive gas as a radial flow stream allows the reactive gas to travel through the catalyst bed along a shorter path length. This reduces the pressure drop for the radial flow portion of the gas.

In some aspects, a catalyst bed in a reactor can be between an inner gap and an outer gap. The inner (or outer) gap can be used to deliver a reactive gas to a desired height relative to the catalyst bed. Typically the reactive gas will exit the inner (or outer) gap at a plurality of heights relative to the catalyst bed. The gas is then passed into the catalyst bed at the desired height. The gas passes through the catalyst bed in the radial direction and exits into the outer (or inner) gap. The gas can continue down the length of the reactor in the outer (or inner) gap until the gas exits from the reactor. The majority, if not substantially all, of the liquid effluent(s) from the catalysts beds travel axially down through the reactor and exit through a reactor effluent outlet.

Alternatively, a reactor can include only an inner conduit for delivery of reactive gas. The gas can travel down the inner conduit to one or more desired heights. The gas then enters the catalyst bed at the desired height as a radial flow. In this type of alternative aspect, the catalyst bed continues to the wall of the reactor, so there is not an outer gap for the gas to exit into. Instead, the gas exits the catalyst bed by travelling axially through the bed along with the liquid being processed.

Radial Delivery of Reactive Gas

In order to deliver one or more gases into a catalyst bed as a radial flow, at least one gap is needed to allow the gas to travel axially into the reactor. If only one gap is present, the gap can be an inner conduit aligned with the central axis of the reactor. One or more gases can be delivered to a desired height relative to the height of the catalyst bed using the inner conduit. Gases at a desired height in the inner conduit can exit the inner conduit and enter a catalyst bed via one or more openings in the conduit. Any convenient type of openings can be used, such as slits, holes, or other types of perforations in the wall of the inner conduit.

The amount of gas delivered into a catalyst bed via radial flow can vary depending on a variety of factors. For some reactions, it may be desirable to deliver all or substantially all of the gas flow in the reactor as a radial gas flow. In other aspects, a portion of the gas flow may delivered as a radial gas flow, while the remainder of the gas flow is delivered as an axial flow that is co-current with the liquid or feedstock being processed in the reactor. For example, the volume of gas delivered as a radial gas flow can be at least 25% of the total gas flow in the reactor, such as at least 35% or at least 50%. Additionally or alternately, the volume of gas delivered as a radial gas flow can be 90% or less of the total gas flow in the reactor, such as 75% or less or 50% or less.

One consideration in delivering a portion of the gas as an axial flow can be improving the flow characteristics of the liquid (feedstock) in the reactor. For example, in reactors with catalyst beds of 30 feet or greater, the feedstock may have some tendency to channel or otherwise not distribute evenly throughout the catalyst bed. A co-axial gas flow can assist in maintaining a more desirable flow pattern. By delivering a portion of the reactive gas or treat gas as an axial flow and a second portion as a radial flow, the benefits of improving the flow pattern (via axial gas flow) can be achieved while also obtaining the benefit of increasing the amount of fresh reactive gas in the lower portions of the catalyst bed (via radial gas flow).

FIG. 1 schematically shows an example of a reactor 100 for delivering gases as a radial flow. In FIG. 1, the reactor 100 includes a catalyst bed 110. An inner conduit 120 provides a volume within catalyst bed 110 that does not contain catalyst. This inner conduit can be used to deliver one or more gases down into the volume of the catalyst bed without the gas having to pass through catalyst. The one or more gases can then exit the inner conduit 120 in an approximately radial direction and enter catalyst bed 110. The direction of gas flow is indicated by arrows 130.

During operation, a liquid feedstock 115 is fed into reactor 100 along with at least one reactive gas 112. For example, in a hydroprocessing reactor, liquid feedstock 115 can be a petroleum fraction and reactive gas 112 can be hydrogen. Optionally, the at least one reactive gas 112 can also include one or more inert gasses, diluent gasses, and/or contaminant gasses, such as nitrogen. After entering reactor 100, liquid feedstock 115 is distributed across the surface of the catalyst bed 110 by distributor tray 125. At least a portion of reactive gas 112 travels down inner conduit to exit into catalyst bed 110 as indicated by arrows 130. Optionally, a remaining portion of reactive gas 112 can be introduced directly into the reactor above catalyst bed 110. This portion of reactive gas flows in a co-current manner with feedstock 115. Having a portion of gas that flows co-current with the feedstock can assist in maintaining a desirable flow pattern within the reactor.

Thus, as feedstock 115 flows down through the catalyst in catalyst bed 110, at least a portion of the reactive gas 112 encounters the feedstock 115 in a cross-flow manner. This occurs while the feedstock is exposed to the catalyst in catalyst bed 110. By introducing at least a portion of the reactive gas (such as hydrogen) in a cross-flow manner, fresh reactive gas is delivered more evenly to various portions of the catalyst bed 110.

In the example shown in FIG. 1, reactor 100 also includes an outer gap 140. Outer gap 140 represents a volume between the wall of reactor 100 and the edge of catalyst bed 110. Any gasses flowing in the radial direction (as indicated by arrows 130) can continue through catalyst bed 110 in a radial direction until the gasses exit the catalyst bed and enter outer gap 140. After entering outer gap 140, the gasses can continue traveling down the reactor as shown by arrows 145. The gasses can eventually exit the reactor via outlet 150. The liquid feedstock that was reacted by exposing the feedstock to catalyst in the presence of the cross-flowing gasses can also exit the reactor via outlet 150.

It is noted that the outward radial flow in FIG. 1 is shown as being approximately perpendicular to the axial direction. However, it is not required that the radial gas flow is a purely radial gas flow. Instead, in many configurations the radial gas flow will also have an axial velocity component. For example, the interaction of the radial gas flow with the axial liquid (and optional gas) flow may impart an axial component to gases introduced as a radial gas flow. Additionally, some vorticity or other non-radial flow velocity within the plane of the catalyst bed may occur.

The example in FIG. 1 includes only one catalyst bed to facilitate explaining the concept of a cross-flow reaction. In other aspects, a plurality of catalyst beds can be included in a reactor. In a reactor with multiple catalyst beds, one or more beds can have reactive gasses introduced as a radial gas flow. If desired, all of the reactive gas flow into at least one bed in a multiple catalyst bed reactor can be axial gas flow, while one or more other beds receive at least a portion of reactive gas as a radial gas flow.

In some aspects, the direction of radial flow in a reactor can be from an inner conduit toward an outer gap. This is the type of example shown in FIG. 1. In these aspects, at least a portion of the reactive gas is introduced into the reactor via an inner conduit.

Typically the inner conduit will be aligned with the central axis of the reactor. The inner conduit can have any convenient size. Preferably, the diameter of the inner conduit is large enough so that any pressure drop within the inner conduit is small relative to the pressure drop across the catalyst bed, such as the pressure drop within the inner conduit being less than about 10% of the pressure drop across the catalyst bed. To deliver reactive gas at one or more desired heights in a catalyst bed, the inner conduit can include a plurality of openings at each desired height. The plurality of openings allow reactive gas to travel down the inner conduit and enter the catalyst bed at the various desired heights. Any convenient number of openings can be used at each height. For example, a plurality of perforations, nozzles, or any other convenient type of opening can be evenly spaced around the circumference of the inner conduit at a given height. The openings at different heights can be aligned around the circumference of the inner conduit, or the openings at different heights can be staggered. Alternatively, the openings can form a spiral or helix pattern, with one or more helices of openings allowing gas to pass from the inner conduit into the catalyst bed.

The number and/or size of holes at a given height within a catalyst bed can vary depending on the nature of the reactions to be performed. For example, in many types of hydroprocessing reactions, conversion and heat generation due to reaction in a fixed bed reactor can decrease with increasing distance through the catalyst bed. As a result, the largest need for reactive gas (such as $H_2$) can be at the top of the catalyst bed, with decreasing need toward the exit from the catalyst bed. To match the reactive gas need for a reaction, a varying number of holes and/or varying sizes of holes can be used at different heights in the reactor bed. Thus, for the hypothetical hydroprocessing reaction discussed above, additional holes can be present in a given hole pattern near the top of a catalyst bed to facilitate delivery of additional hydrogen near the top of the catalyst bed.

Figure 2A:
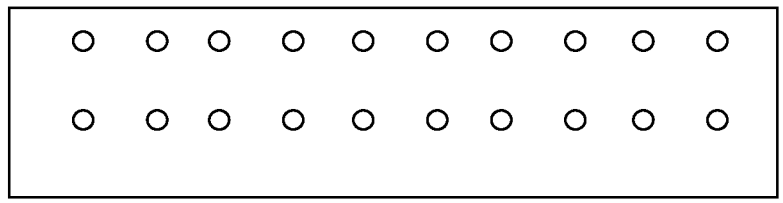
FIGS. 2a, 2b and 2c schematically show patterns of openings for gas delivery.
Figure 2B:
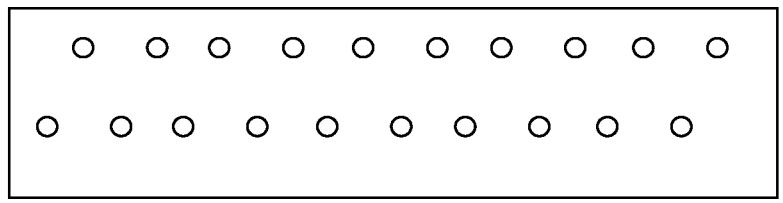
Figure 2C:
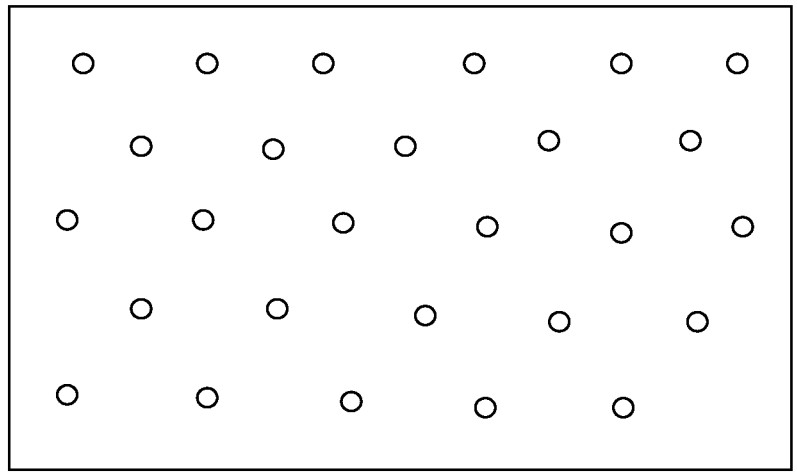

FIG. 2 shows examples of three different patterns for arranging the openings for gas delivery from the inner conduit. In FIG. 2, the openings are displayed as they would appear on a planar surface for convenience in demonstrating the concept. FIG. 2a shows rows of openings that are aligned both in the horizontal and vertical directions. A pattern such as the pattern in FIG. 2a can be repeated as necessary to deliver gas in a radial flow at a plurality of desired heights. FIG. 2b shows a pattern where openings are aligned horizontally but offset vertically. This type of pattern can be repeated as necessary to deliver gas in a radial flow at a plurality of desired heights. Note that a strict repeat of the pattern is not required, so that the third row of openings does not need to be aligned with any previous row. FIG. 2c shows a pattern that would generate spiral or helical series of openings when used on a cylindrical inner conduit. The "spirals" shown in FIG. 2c are vertically aligned, but spirals offset in the vertical direction can also be used.

Containing Catalyst in a Catalyst Bed

Due to the presence of the inner conduit and the outer gap, the catalyst bed can include some additional features. One set of features is related to maintaining the catalyst and the liquid feedstock within the catalyst bed, so that catalyst and liquids do not enter the inner conduit or the outer gap. In a conventional fixed bed reactor, a catalyst bed in the reactor will occupy the entire area of the reactor at a given height. In such a conventional reactor, the reactor wall and the bottom surface of the catalyst bed provide the constraints to keep catalyst within the catalyst bed.

In a reactor with an outer gap, the outer edge of the catalyst bed does not correspond to the wall of the reactor. Instead, there is a gap between the edge of the catalyst bed and the reactor wall. As a result, another structure is needed to maintain catalyst within the catalyst bed. Additionally, the structure should also be suitable for retaining liquids within the catalyst bed so that liquid feedstock does not exit the catalyst bed via the outer gap. Because the liquid feedstock also needs to be constrained, a conventional catalyst mesh such as the mesh used for the bottom of a catalyst bed is not sufficient.

One solution is to use a gas/liquid selective membrane structure as the side constraint for the catalyst bed for the side of the catalyst bed in which the reactive gas is to exit the catalyst bed (i.e., either located at the inner conduit or at the outer gap depending upon the radial flow orientation of the reactive gas in the reactor). A variety of membranes are known that are permeable to gas phase fluids while preventing the passage of liquid phase fluids. Such a membrane can be reinforced with support beams or other support structures to provide sufficient structural integrity to support the combined pressure of the catalyst bed and the gas passing through the membrane structure to reach the outer gap. Similar membranes can also be used to prevent the flow of liquid or catalyst into the inner conduit. A variety of suitable membranes are available that are permeable for gas phase fluids while retaining liquid phase fluids. Examples include gas permeable ceramic membranes available from Ceramatec, Inc. or gas permeable metal membranes available from Pall Corporation. Such membrane structures can also be used to prevent passage of liquid and catalyst through openings in an inner conduit. Alternatively, for some shapes of openings in an inner conduit, it may be sufficient to restrain catalyst from passing through openings in the inner conduit. For such openings, a wire mesh such as the mesh used for supporting a catalyst bed can be used.

In this manner, a substantial amount of the reactive gas entering any catalyst bed in the reactor can pass axially through the catalyst bed, through the membrane and out of the reactor substantially separate from the reactor liquid effluent from the catalyst bed. Preferably, in any given catalyst bed, at least about 50 vol %, more preferably at least about 75 vol %, of the reactive gas radially entering the catalyst bed is passed through the catalyst bed and is collected on the other radial side of the catalyst bed separate from the liquid reaction effluent. Preferably, this reactive gas is passed through a gas/liquid selective membrane structure which allows the reactive gas to pass through the membrane and to be collected separately from the liquid reaction effluent for any given catalyst bed by substantially restricting the passage of the liquid reaction effluent through the selective membrane barrier. Preferably at about 50 vol %, more preferably at least 75 vol %, more preferably at least 90 vol %, and most preferably substantially all of the liquid reaction effluent exiting a particular catalyst bed continues to move axially through the reactor to either the next catalyst bed or to a reactor effluent outlet, where it can be collected and further processed as necessary.

Configurations for Supporting a Catalyst Bed with an Outer Gap

A second feature of a reactor with a gap between the catalyst bed and the reactor wall is the method of support for the catalyst bed platform. In various aspects, any convenient type of catalyst bed platform can be used for supporting a catalyst. The catalyst bed platform can be selected based on the type of catalyst to be used in the catalyst bed. One consideration can be related to the size of the mesh or grid used for the catalyst bed platform. The mesh size can be selected to be small enough that catalyst particles are retained within the catalyst bed. This can be achieved, for example, by having a catalyst bed platform with a suitable mesh size. Alternatively, the catalyst bed platform can be constructed of a plurality of intersecting beams, with an overlay grating that provides a suitable mesh size.

In a configuration where only an inner conduit is present, if the reactor has a diameter of about 1 meter or less, supporting the catalyst bed by welding the bed support structure and/or the catalyst support grid to the reactor wall may be an option. However, in a reactor with a gap between the catalyst bed and the reactor wall, this type of support is not available.

One option for supporting a catalyst bed with an outer gap is to use horizontal support beams that form a part of the catalyst bed platform and/or are underneath the catalyst bed to provide support. The horizontal support beams can be welded to the sides of the reactor. Alternatively, beam seats for receiving and supporting the horizontal support beams can be welded to the sides of the reactor. The horizontal support beams can span the diameter of the reactor at various offset angles, or the horizontal support beams can be in the form of parallel supports, or a grid of intersecting beams can be used.

Another option for supporting the catalyst bed is to use one or more vertical supports underneath the catalyst bed. For example, a plurality of vertical supports in a radially symmetric pattern could be used to support the catalyst bed from underneath the bed. The plurality of vertical supports could then be supported by the bottom of the reactor. If the bed being supported is not the lowest bed in the reactor, the vertical supports can pass through the volume of the underlying catalyst bed.

Additionally or alternately, a catalyst bed can be supported by a center support pipe. This can correspond to the central axis of the support pipe being approximately aligned with the geometric center of the catalyst bed. Alternatively, the central axis of the support pipe can be approximately aligned with the central axis of the reactor.

A center support pipe can be constructed from any materials suitable for supporting a catalyst bed platform in the reaction environment present in the reactor. For example, the pipe can be constructed from a bulk structural material similar to the reactor wall, with a coating or cladding layer on the outside that is more resistant to corrosion or other reactions. Other choices of material are possible, so long as the center pipe has sufficient strength to transfer the weight of the catalyst platform to the bottom of the reactor.

The center support is referred to here as a pipe due to the fact that the center support may optionally be hollow, or optionally hollow for a portion of the length of the pipe. Use of a hollow center support, or a center support pipe, can allow the interior volume of the center support to be used as a pathway for unloading catalyst. In such an embodiment, an opening can be included in the catalyst bed platform to allow for removal of catalyst from the catalyst bed platform. The exit for the catalyst dumping tube can be located far enough down the center support pipe so that the exit is below the top of the lower catalyst bed when filled. Alternatively, a center support pipe can be used as an inner conduit for radial gas flow delivery in an underlying catalyst bed.

The center support pipe can be supported by a structure that serves as the outlet collector. Alternatively, the center support pipe can be supported by a plurality of legs. The legs can rest on the floor of the reactor. Any convenient number of legs can be used, such as three or more, or four or more.

Use of a center support pipe for supporting a catalyst bed platform can provide a variety of advantages. A center support pipe is compatible for use with conventional types of catalyst bed platforms. A catalyst bed platform supported by a center support pipe can also be leveled sufficiently to approximate the levelness of a conventional catalyst bed. In a situation where an additional catalyst bed is desired in a single bed reactor, a catalyst bed platform with a center support pipe can allow for installation of an additional catalyst bed without having to support the catalyst bed via welding to the bulk structural portion of the reactor wall. Introducing a catalyst bed platform with a center support pipe does result in an excluded volume in the center of the reactor. However, the excluded volume from the center pipe will typically be small relative to the total volume of the reactor.

The support pipe for supporting the catalyst bed platform can also be used to support a flow distributor. A flow distributor can be a distributor plate, a distributor tray, or any other type of reactor internal that can be used to distribute the flow exiting from a catalyst bed. When a fluid flow emerges from a catalyst bed, it can be desirable to redistribute the flow, so that the flow will be more evenly distributed when exposed to the next catalyst bed or other reaction stage. If too much flow is incident on a portion of the tray or plate, not all of the fluid will be able to pass through the openings near the flow. Instead, the liquid level in the tray or plate will equilibrate, resulting in distribution of the flow over a larger portion of the area of the tray or plate. One or more such trays or plates can be used in a flow distribution device.

Example of Center Pipe Structure within a Reactor

Figure 3A:
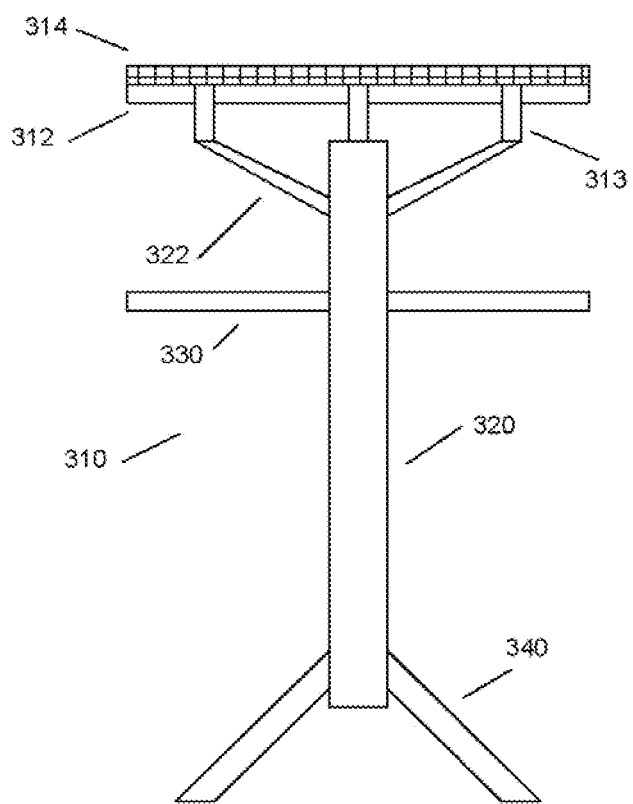
FIGS. 3a, 3b and 3c schematically show a catalyst bed platform supported by a center support pipe.

FIG. 3a schematically shows an example of a catalyst bed platform supported by a center support pipe. FIG. 3a provides a side view of a catalyst bed platform 310. In the embodiment shown in FIG. 3a, the platform is composed of a plurality of cross beams 312 and 313 that support a grid or mesh 314. Depending on the embodiment, some of the cross beams 313 can be directly supported by center pipe 320, while other beams 313 transfer weight to the center pipe 320 via support arms 322. Center pipe 320 also supports a flow distributor 330. The flow distributor 330 can include one or more distributor plates, distributor trays, or other devices for more evenly distributing a fluid flow. Optionally, flow distributor 330 can include or be replaced by a quench facility which introduces additional fluid into the reactor between the catalyst beds. Center pipe 320 is supported by support legs 340. In the embodiment shown in FIG. 3a, two of three support legs are shown.

Figure 3B:
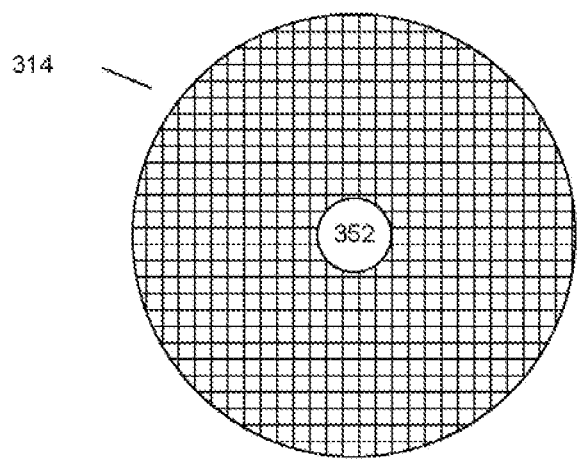

FIG. 3b shows a top down view of the catalyst bed platform. In FIG. 3b, grid or mesh 314 covers all or nearly all of the surface area of the catalyst bed platform. Grid or mesh 314 is schematically represented here, but is understood to have a mesh size suitable for supporting a desired type of catalyst particle. Suitable catalyst particles can include hydroprocessing catalysts. The embodiment in FIG. 3b also includes an opening 352 for the catalyst dumping tube.

Figure 3C:
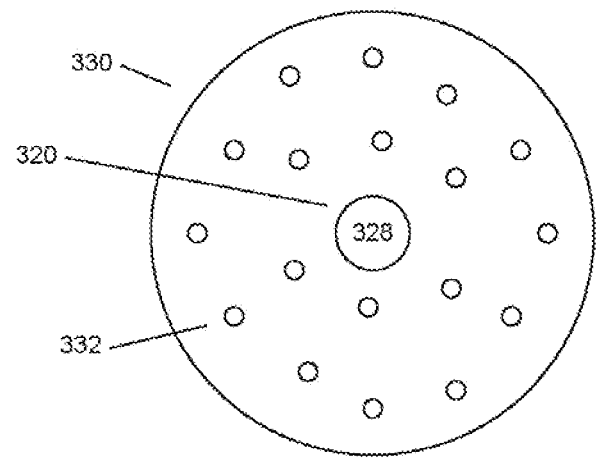

FIG. 3c shows a cut away view of the structure in FIG. 3a in the plane of the flow distributor 330. In FIG. 3c, flow distributor 330 is represented as a plate containing perforations or holes 332. Alternatively, any convenient type of flow distributor can be used. Flow distributor 330 is supported by center pipe 320. However, fluid in the flow distributor 330 is not in fluid communication with the interior 328 of center pipe 320.

Figure 4:
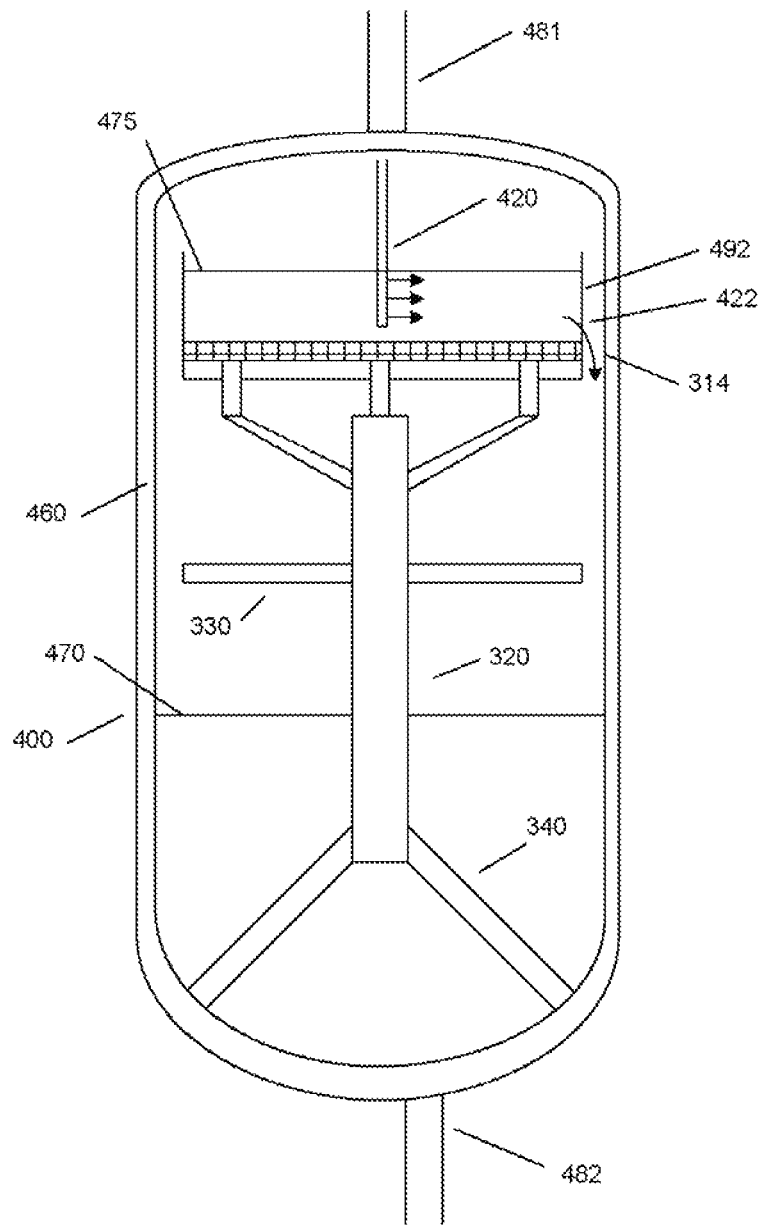
FIG. 4 schematically shows a reactor containing a catalyst bed platform supported by a center support pipe.

FIG. 4 schematically shows a view of a catalyst bed platform supported by a center pipe within a reactor. In FIG. 4, a reactor 400 is shown. Reactor 400 includes a reactor wall 460. It is noted that FIG. 4 is provided to show an example of a platform structure within a reactor and is not intended to be to scale. For example, catalyst bed 475 would typically have a greater height than radial width.

In FIG. 4, reactor 400 includes two catalyst beds 470 and 475. Catalyst bed 470 corresponds to a catalyst bed supported by the floor of the reactor. In this example, the reactor was initially configured for one catalyst bed 470. The addition of catalyst bed platform allows for second catalyst bed 475 to be formed in the reactor. Catalyst located in catalyst bed 475 is constrained to stay in bed 475 by side membrane structures 492. During operation, fluids for use in a reaction can enter reactor 400 at a location above the top of catalyst bed 475, such as inlet 481. Liquid feedstock enters the reactor axially and passes through catalyst bed 475 and then through the mesh 314. Gasses can also pass through catalyst bed 475 axially and/or gasses can be delivered into catalyst bed 475 as a radial flow via inner conduit 420. Gasses that enter as a radial flow can exit catalyst bed 475 by passing through membrane structure 492 on the side of the catalyst bed (as shown by arrow 422). The fluid then passes through flow distributor 330 prior to entering catalyst bed 470. Note that a portion of the volume of catalyst bed 470 is displaced by the center pipe 320 and the supporting legs 340. The effluent from the reactor can then be withdrawn via an outlet 482.

Figure 5:
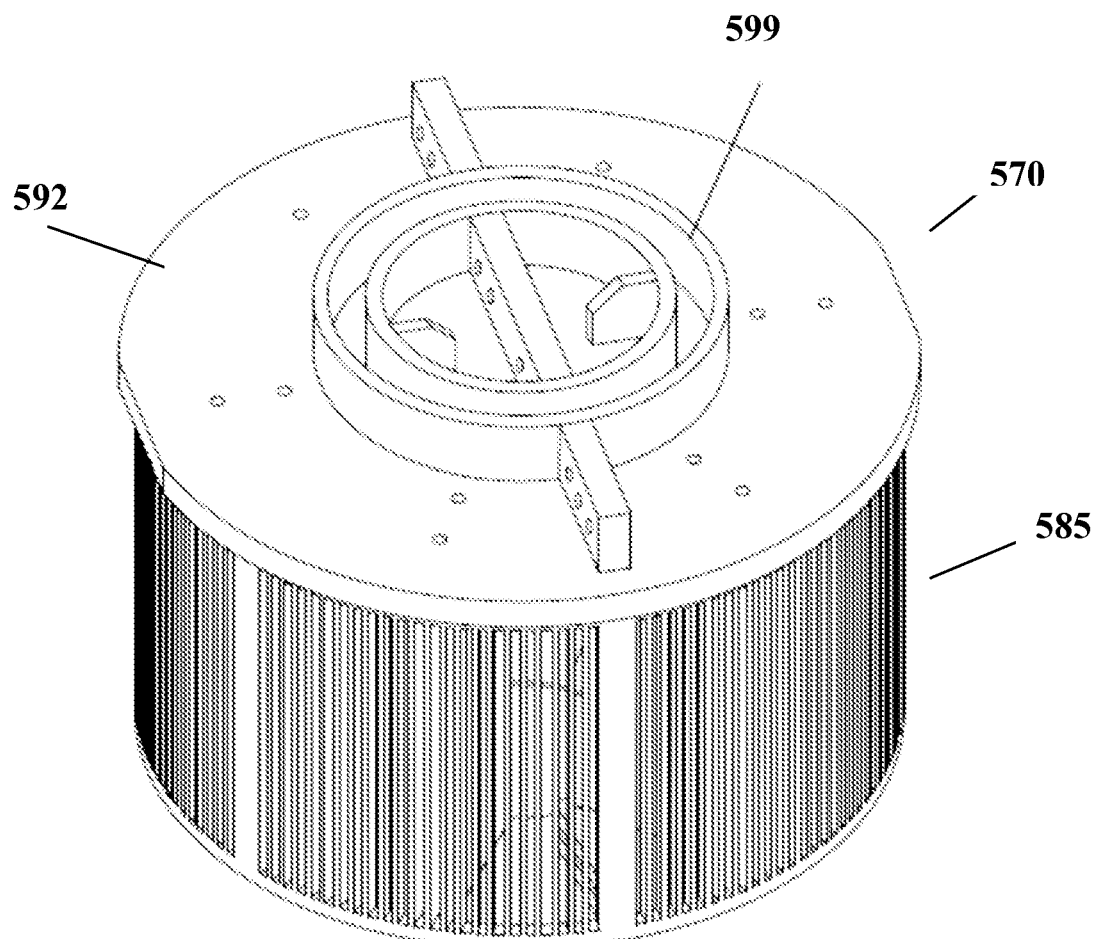
FIG. 5 schematically shows an alternative support structure for a support pipe.

As an alternative to the support legs shown in FIG. 3 and FIG. 4, a catalyst support pipe can instead be supported by a collector support 570 as shown in FIG. 5. The collector support 570 has a grating structure 585 that can allow fluid to pass through the collector support grating while preventing catalyst particles from passing through. The top of collector support 570 corresponds to a collector hat 592. Collector hat 592 includes a support ring 599 for receiving the bottom of a center support pipe. Note that the example shown in FIG. 5 appears to have a roughly planar bottom surface. The shape of the bottom surface for a collector 570 can optionally be matched to the shape of the bottom surface of a reactor. Also, in the example shown in FIG. 5, the collector hat 592 has a roughly planar shape. In another embodiment, the collector hat 592 can have a conical shape.

Figure 6:
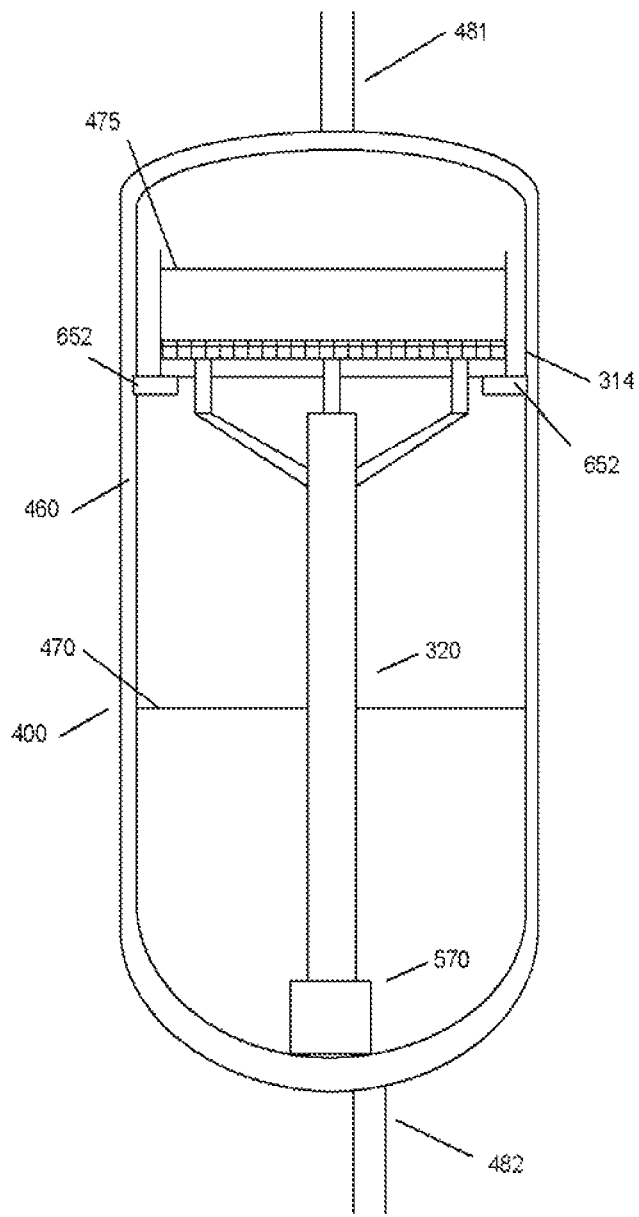
FIG. 6 schematically shows a catalyst bed platform that includes horizontal supports.
Figure 7:
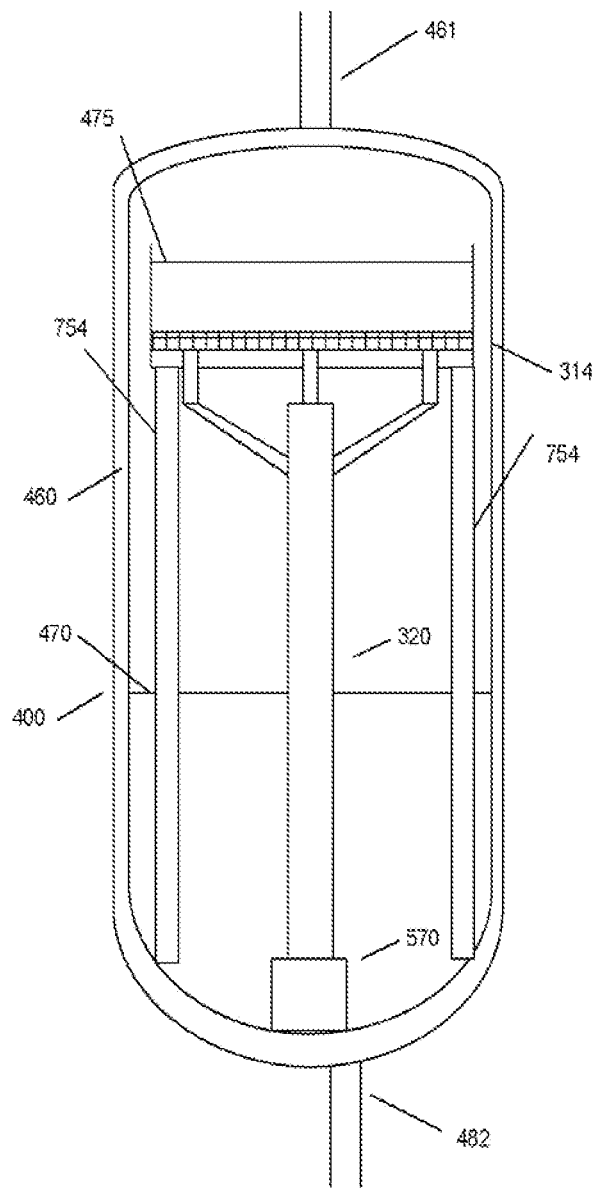
FIG. 7 schematically shows a catalyst bed platform that includes vertical supports.

FIGS. 6 and 7 show some alternative configurations for including a catalyst bed platform with an outer gap. In FIG. 6, a catalyst bed platform is shown that is supported by horizontal beam supports 652. The horizontal beam supports can be supported by beam seats (not shown) that are welded to the reactor wall. In this type of configuration, the center pipe support 320 is optional. In the configuration shown in FIG. 6, the optional center support pipe 320 is supported by an alternative collector structure, such as the collector structure 570 shown in FIG. 5. In FIG. 6, elements 314, 400, 460, 470, 475, 481, and 482 are as described in the context of FIG. 4. Similarly, FIG. 7 shows a configuration where vertical beam supports 754 are used to support the catalyst bed platform, in addition to the optional center support pipe 320. The vertical support beams 754 can be located at any convenient location under the catalyst bed platform. Preferably, the arrangement of the vertical support beams can be symmetric, to reduce or mitigate disruption of the fluid flow pattern below the catalyst bed platform. The vertical support beams 754 can be supported in any convenient manner, such as by using any of the support structures contemplated for the center support pipe or the horizontal support beams. In FIG. 7, elements 314, 400, 460, 470, 475, 481, 482, and 570 are as described in the context of FIG. 4 and FIG. 6.

In some alternative aspects, the direction of radial flow in a reactor can be the opposite of the direction of flow shown in FIG. 1. In such alternative aspects, the reactive gas can be introduced into the catalyst bed from an outer gap between the catalyst bed and the reactor wall. The reactive gas then flows in an inward radial direction. When the reactive gas exits the catalyst bed, the reactive gas enters the inner conduit. The gas in the inner conduit can then travel axially in the reactor to the reactor exit.

In such alternative aspects, the outer wall of the catalyst bed can have a structure analogous to an inner conduit in the outward radial flow configuration. In other words, a catalyst bed can have an outer wall formed from a structural material, with a plurality of openings at one or more heights relative to the catalyst bed in order to deliver the inward radial flow of gas. Similarly, the inner conduit can correspond to a structurally supported membrane that receives the inward radial flow of gas.

In still other alternative aspects, the catalyst bed in a reactor can extend to the catalyst wall without an outer gap. In such aspects, reactive gas from an inner conduit can be introduced with an outward radial flow, but there is not a corresponding outer gap for receiving the gas. Since the gas cannot exit the catalyst bed in the radial direction, the gas will eventually flow out in the axial direction by exiting from the bottom of the catalyst bed along with the reacted feedstock.

Feedstocks

Feedstocks suitable for use in various aspects are hydrocarbon feedstocks where at least a portion of the feedstock is in a liquid state during contact with the catalyst in the presence of a reactive gas. In a hydroprocessing and/or other petroleum processing context, suitable feedstocks include atmospheric and vacuum residua, propane deasphalted residua, e.g., brightstock, cycle oils, FCC tower bottoms, gas oils, including atmospheric and vacuum gas oils and coker gas oils, light to heavy distillates including raw virgin distillates as well as diesel and/or kerosene boiling range distillates, hydrocrackates, hydrotreated oils, dewaxed oils, slack waxes, Fischer-Tropsch waxes, oil in was streams, raffinates, other effluents or fractions of effluents derived from hydroprocessing of one of the above types of feedstocks, and mixtures of these materials. In addition, non-conventional feedstocks may be employed such as bio based feeds or lubricants. Other feeds may be polymers, perfumes or C30+ linked molecular streams in order to isolate key polymers, molecules for perfumes and certain shaped linked C30+ molecules (multi-ring structures that actually preserve the viscosity of single rings). Typical feeds would include, for example, vacuum gas oils and/or other feedstocks with an initial boiling point of at least about 350° C. (660° F.), such as about 371° C. (700° F.). Alternatively, a feed can be characterized based on a T5 boiling point. A T5 boiling point refers to the temperature at which 5 wt % of a feed will boil. Thus, a typical feed can have a T5 boiling point of at least about 350° C., such as at least about 371° C. The final boiling point of the feed can be about 593° C. (1100° F.) or less, such as 566° C. (1050° F.) or less. Alternatively, a feed can be characterized based on a T95 boiling point, which refers to a temperature where 95 wt % of the feed will boil. The T95 boiling point of a feed can be 593° C. or less, such as 566° C. or less.

A mineral hydrocarbon or petroleum feedstock refers to a conventional (e.g., non-biocomponent) hydrocarbon feedstock, typically derived from crude oil and that has optionally been subjected to one or more separation and/or other refining processes. Unless specifically noted otherwise, references to a hydrocarbon or petroleum feedstock herein include feedstocks or fractions that also contain types and quantities of heteroatoms that may be found at various stages of processing in a petroleum fraction and/or a fraction derived from a biological source. For example, a hydrocarbon or petroleum feedstock, unless specified otherwise, may optionally include heteroatoms such as sulfur, nitrogen, oxygen, or other elements that may be present in a petroleum fraction based on the petroleum (or biological) source and/or based on any processing of the feedstock. In some alternative aspects, a hydrocarbon feedstock may be composed substantially of carbon and hydrogen. Such a feedstock composed substantially of carbon and hydrogen is defined as a feedstock containing less than 1 wt % of atoms other than carbon and hydrogen, such as less than 0.5 wt % and preferably less than 0.1 wt %. In one preferred embodiment, the mineral hydrocarbon or petroleum feedstock can be a petroleum feedstock boiling in the diesel range or above.

Typical mineral feedstocks can have a nitrogen content from about 50 wppm to about 2000 wppm nitrogen, for example from about 50 wppm to about 1500 wppm or from about 75 to about 1000 wppm. In some aspects, the mineral feedstock can have a sulfur content from about 100 wppm to about 25,000 wppm sulfur, for example from about 200 wppm to about 10,000 wppm or from about 350 wppm to about 2,500 wppm. Additionally or alternately, a feedstock can have a sulfur content of at least about 5 wppm, for example at least about 10 wppm, at least about 25 wppm, at least about 100 wppm, at least about 500 wppm, or at least about 1000 wppm. Further additionally or alternately, the feedstock can have a sulfur content of about 2000 wppm or less, for example about 1000 wppm or less, about 500 wppm or less, about 100 wppm or less, or about 50 wppm or less. In still other aspect, some types of feedstocks such as vacuum resid feeds can have still higher sulfur contents, such as 40,000 wppm of sulfur or less, or 50,000 wppm of sulfur or less, or potentially even higher sulfur contents. Still further additionally or alternately, the nitrogen content of the feedstock can be about 1000 wppm or less, for example about 500 wppm or less, about 100 wppm or less, about 50 wppm or less, about 30 wppm or less, about 20 wppm or less, or about 10 wppm or less.

In some instances, it may be desirable to use a feed derived from a biological source for at least a portion of the feedstock. In the discussion below, a biocomponent feed or feedstock refers to a feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Other biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. Other options for determining components and/or concentrations include any convenient method, such as high pressure liquid chromatography, gas phase chromatography, and spectroscopic methods. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. In one embodiment, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

In an embodiment, the feedstock can include at least about 5% by weight of glycerides, lipids, fatty acids, fatty acid esters (such as fatty acid alkyl esters), or a combination thereof. The gylcerides can include monoglycerides, diglycerides, or triglycerides. Preferably, the feedstock can include at least about 5 wt %, or at least about 10 wt %, or at least 20 wt % of glycerides, lipids, fatty acids, fatty acid esters, fatty acid alkyl esters, or a combination thereof. Alternatively, the feedstock can include about 55 wt % or less, or about 35 wt % or less, or about 25 wt % or less, or about 20 wt % or less of glycerides, lipids, fatty acids, fatty acid esters, fatty acid alkyl esters, or a combination thereof. In an embodiment, the feedstock can include glycerides and/or fatty acid esters. Preferably, the feedstock can include triglycerides, fatty acid methyl esters, or a combination thereof.

In an embodiment, the biocomponent portion of the feedstock (such as the glycerides and/or fatty acid esters) can be a non-hydrotreated portion. A non-hydrotreated feed can typically have an olefin content and an oxygen content similar to the content of the corresponding raw biocomponent material. Examples of suitable biocomponent feeds can include food grade vegetable oils, and biocomponent feeds that are refined, bleached, and/or deodorized.

Biocomponent based feedstreams can have a wide range of nitrogen and/or sulfur contents. For example, a biocomponent based feedstream based on a vegetable oil source can contain up to about 300 wppm nitrogen. In contrast, a biomass based feedstream containing whole or ruptured algae can sometimes include a higher nitrogen content. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a biocomponent feed can also vary. In some embodiments, the sulfur content can be about 500 wppm or less, for example about 100 wppm or less, about 50 wppm or less, or about 10 wppm or less.

Aside from nitrogen and sulfur, oxygen can be another heteroatom component in biocomponent based feeds. A biocomponent diesel boiling range feedstream based on a vegetable oil, prior to hydrotreatment, can include up to about 10 wt % oxygen, for example up to about 12 wt % or up to about 14 wt %. Additionally or alternately, such a biocomponent diesel boiling range feedstream can include at least about 1 wt % oxygen, for example at least about 2 wt %, at least about 3 wt %, at least about 4 wt %, at least about 5 wt %, at least about 6 wt %, or at least about 8 wt %. Further additionally or alternately, a biocomponent feedstream, prior to hydrotreatment, can include an olefin content of at least about 3 wt %, for example at least about 5 wt % or at least about 10 wt %.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

Conditions for Processing with Radial Gas Flow—Hydroprocessing

A variety of types of processes involving contacting a fluid with a catalyst in the presence of a reactive gas can be performed using the radial flow gas distribution described herein. The various types of hydroprocessing of petroleum fractions correspond to some suitable processes. Examples of hydroprocessing include hydrotreatment, hydrocracking, catalytic dewaxing, and hydrofinishing or aromatic saturation.

Hydrotreatment is typically used to reduce the sulfur, nitrogen, and aromatic content of a feed. Hydrotreating conditions can include temperatures of about 200° C. to about 450° C., or about 315° C. to about 425° C.; pressures of about 250 psig (1.8 MPa) to about 5000 psig (34.6 MPa) or about 300 psig (2.1 MPa) to about 3000 psig (20.8 MPa); Liquid Hourly Space Velocities (LHSV) of about 0.05 to about 10 $h^{-1}$; and hydrogen treat rates of about 200 scf/B (35.6 $m^3/m^3$) to about 10,000 scf/B (1781 $m^3/m^3$), or about 500 (89 $m^3/m^3$) to about 10,000 scf/B (1781 $m^3/m^3$). For the hydrogen treat gas, the purity of the treat gas can be at least about 60 mol %, such as at least about 80 mol % or at least about 90 mol %. With regard to LHSV and hydrogen treat rate, it is noted that the hydrogen to feed ratio in a conventional axial flow fixed bed reactor is typically a multiple of the stoichiometric hydrogen need. This is due to flow maldistribution, which can lead to local hydrogen starvation and catalyst coking if a sufficient excess of hydrogen is not introduced into the reactor. The introduction of a radial flow of hydrogen (or another reactive gas) can mitigate this problem, allowing a lower multiple of the stoichiometric need to be selected due to the additional fresh hydrogen being introduced throughout the height of the catalyst bed. As a result, lower LHSV values such as 0.1 $hr^{-1}$ or even 0.05 $hr^{-1}$ may be acceptable, due to the reduced risk of hydrogen starvation within the catalyst bed.

During hydrotreatment, the sulfur and nitrogen contents of a feedstock can be reduced. In an embodiment, one or more hydrotreating stages can preferably reduce the sulfur content to a suitable level, such as less than about 100 wppm, or less than about 50 wppm, or less than about 25 wppm, or less than about 15 wppm. In another preferred embodiment, the hydrotreating stage(s) can reduce the sulfur content of the feed to less than about 5 wppm, preferably less than about 3 wppm. With regard to nitrogen, the hydrotreating stage(s) can preferably reduce the nitrogen content of the feed to about 20 wppm or less, or about 10 wppm or less, or about 5 wppm or less, or about 3 wppm or less.

A hydrotreatment process can also be used to substantially deoxygenate a feedstock. This corresponds to removing at least 90%, or at least 95%, or at least 98%, or at least 99% of the oxygen present in the biocomponent feedstock. Alternatively, substantially deoxygenating the feedstock can correspond to reducing the oxygenate level of the total feedstock to 0.1 wt % or less, or 0.05 wt % or less, or 0.01 wt % or less, or 0.005 wt % or less.

Hydrotreating catalysts are typically those containing Group VIB metals (Group 6 of IUPAC periodic table), such as molybdenum and/or tungsten, and non-noble Group VIII metals (Groups 8-10 of IUPAC periodic table), such as, iron, cobalt and nickel and mixtures thereof. These metals or mixtures of metals are typically present as oxides or sulfides on refractory metal oxide supports. Suitable metal oxide supports include low acidic oxides such as silica, alumina or titania. Examples of aluminas for use in alumina supports include porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. Examples of suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on silica or on alumina. Alternatively, a hydrotreating catalyst can be a bulk metal catalyst. By bulk metal, it is meant that the catalysts are unsupported wherein the bulk catalyst particles comprise 30-100 wt. % of at least one Group VIII non-noble metal and at least one Group VIB metal, based on the total weight of the bulk catalyst particles.

Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Non-limiting examples of metals for hydrocracking catalysts include nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various aspects, the conditions selected for hydrocracking can depend on the boiling range of the feedstock, the desired level of conversion, the level of contaminants in the input feed to the hydrocracking stage, and potentially other factors. For example, a hydrocracking process performed under sour conditions, such as conditions where the sulfur content of the input feed to the hydrocracking stage is at least 500 wppm, can be carried out at temperatures of about 550° F. (288° C.) to about 840° F. (449° C.), hydrogen partial pressures of from about 250 psig to about 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other aspects, the conditions can include temperatures in the range of about 600° F. (343° C.) to about 815° F. (435° C.), hydrogen partial pressures of from about 500 psig to about 3000 psig (3.5 MPag-20.9 MPag), liquid hourly space velocities of from about 0.2 $h^{-1}$ to about 2 $h^{-1}$ and hydrogen treat gas rates of from about 213 $m^3/m^3$ to about 1068 $m^3/m^3$ (1200 SCF/B to 6000 SCF/B).

A hydrocracking process performed under non-sour conditions can be performed under conditions similar to those describe above. Alternatively, a non-sour hydrocracking stage can have less severe conditions than a similar hydrocracking stage operating under sour conditions. Suitable hydrocracking conditions can include temperatures of about 550° F. (288° C.) to about 840° F. (449° C.), hydrogen partial pressures of from about 250 psig to about 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). For the hydrogen treat gas, the purity of the treat gas can be at least about 60 mol %, such as at least about 80 mol % or at least about 90 mol %. In other embodiments, the conditions can include temperatures in the range of about 600° F. (343° C.) to about 815° F. (435° C.), hydrogen partial pressures of from about 500 psig to about 3000 psig (3.5 MPag-20.9 MPag), liquid hourly space velocities of from about 0.2 $h^{-1}$ to about 2 $h^{-1}$ and hydrogen treat gas rates of from about 213 $m^3/m^3$ to about 1068 $m^3/m^3$ (1200 SCF/B to 6000 SCF/B). In some embodiments, multiple hydrocracking stages may be present, with a first hydrocracking stage operating under sour conditions, while a second hydrocracking stage operates under non-sour conditions and/or under conditions where the sulfur level is substantially reduced relative to the first hydrocracking stage. In such embodiments, the temperature in the second stage hydrocracking process can be about 40° F. (22° C.) less than the temperature for a hydrocracking process in the first stage, or about 80° F. (44° C.) less, or about 120° F. (66° C.) less. The pressure for the second stage hydrocracking process can be 100 psig (690 kPa) less than a hydrocracking process in the first stage, or 200 psig (1380 kPa) less, or 300 psig (2070 kPa) less.

In situations where both hydrotreatment and hydrocracking are performed in a reactor, the same conditions can be used for hydrotreating and hydrocracking beds or stages, such as using hydrotreating conditions for both or using hydrocracking conditions for both. In yet another aspect, the pressure for the hydrotreating and hydrocracking beds or stages can be the same.

Catalytic dewaxing process can be valuable in processing of various types of distillate boiling range feedstocks, including fuel distillates (such as diesel) as well as lubricant boiling range distillates. For a catalytic dewaxing process, suitable dewaxing catalysts can include molecular sieves such as crystalline aluminosilicates (zeolites) or silico-aluminophosphates (SAPOs). Examples of suitable molecular sieves include 1-D or 3-D molecular sieves. In one aspect, the molecular sieve can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48, or ZSM-48 and/or zeolite Beta. Optionally but preferably, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Preferred materials are EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

In some aspects, a dewaxing catalyst can be a catalyst with a low ratio of silica to alumina in the molecular sieve. For example, for ZSM-48, the ratio of silica to alumina in the zeolite can be less than 200:1, or less than 110:1, or less than 100:1, or less than 90:1, or less than 80:1. In various embodiments, the ratio of silica to alumina can be from 30:1 to 200:1, 60:1 to 110:1, or 70:1 to 100:1.

In various aspects, the catalysts according to the invention further include a metal hydrogenation component. The metal hydrogenation component is typically a Group VIB (Group 6 of IUPAC periodic table) and/or a Group VIII (Groups 8-10 of IUPAC periodic table) metal. Preferably, the metal hydrogenation component is a Group VIII noble metal. Preferably, the metal hydrogenation component is Pt, Pd, or a mixture thereof. In an alternative preferred embodiment, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For embodiments where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the invention can also include a binder. In some embodiments, the dewaxing catalysts used in process according to the invention are formulated using a low surface area binder, a low surface area binder represents a binder with a surface area of 100 m$^2$/g or less, or 80 m$^2$/g or less, or 70 m$^2$/g or less. A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

Process conditions in a catalytic dewaxing zone in a sour environment can include a temperature of about 200° C. to about 450° C., preferably about 270° C. to about 400° C., a hydrogen partial pressure of about 1.8 to about 34.6 mPa (250 to 5000 psi), preferably about 4.8 to about 20.8 mPa, a liquid hourly space velocity of from about 0.2 hr$^{-1}$ to about 10 hr$^{-1}$, preferably about 0.5 hr$^{-1}$ to about 3.0 hr$^{-1}$, and a hydrogen circulation rate of from about 35.6 to about 1781 m$^3$/m$^3$ (200 to 10,000 scf/B), preferably about 178 to about 890.6 m$^3$/m$^3$ (1000 to 5000 scf/B). For the hydrogen treat gas, the purity of the treat gas can be at least about 60 mol %, such as at least about 80 mol % or at least about 90 mol %. In still other embodiments, the conditions can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF/B to 6000 SCF/B). These latter conditions may be suitable, for example, if the dewaxing stage is operating under sour conditions.

Hydrofinishing and/or aromatic saturation catalysts can include catalysts containing Group VIB metals (Group 6 of IUPAC periodic table), Group VIII metals (Groups 8-10 of IUPAC periodic table), and mixtures thereof. In one aspect, preferred metals include at least one metal sulfide having a strong hydrogenation function. Alternatively, the hydrofinishing catalyst can include a Group VIII noble metal, such as Pt, Pd, or a combination thereof. The mixture of metals may also be present as bulk metal catalysts wherein the amount of metal is about 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from about 125° C. to about 425° C., preferably about 180° C. to about 280° C., total pressures from about 500 psig (3.4 MPa) to about 3000 psig (20.7 MPa), preferably about 1500 psig (10.3 MPa) to about 2500 psig (17.2 MPa), and liquid hourly space velocity from about 0.1 hr$^{-1}$ to about 5 hr$^{-1}$ LHSV, preferably about 0.5 hr$^{-1}$ to about 1.5 hr$^{-1}$.

Example

Pressure Drop for Axial Flow Versus Radial Flow

To demonstrate the benefit in reduced pressure drop for radial flow, pressure drop calculations were performed for a reactor suitable for performing hydroprocessing type process. A pressure drop was calculated for the reactor in a co-current axial flow configuration and in a radial flow configuration according to an aspect of the invention.

The specifications for the reactor and catalyst included a reactor diameter of 9.5 ft (2.9 m), a bed length of 40 ft (12.2 m), a bed volume of 2,835 ft$^3$ (82 m$^3$), an equivalent catalyst diameter of 1.01 mm, a catalyst sphericity of 0.60, and a bed void fraction of 0.40. The dimensions were selected based on an existing reactor in operation. During operation of the reactor, sample measurements of the fluid flow properties in the reactor were obtained during co-current axial operation for performing a hydroprocessing reaction. These fluid flow properties are shown in Table 1:

TABLE 1

|  |  | Liquid | Vapor |
| --- | --- | --- | --- |
| Mass flow rate | lb/h | 61,630 | 73,420 |
| Density | lb/ft3 | 38.436 | 1.293 |
| Viscosity | cP | 0.1651 | 0.0140 |
| Surface tension | dynes/cm | 5.94 |  |

Calculations were then performed to determine the pressure drop for the reactor, and for a reactor operating under similar conditions with the exception that the vapor is delivered as a radial flow instead of as a co-current axial flow. In order to make the comparison, the following assumptions were used in creating the radial flow model. First, the catalyst was assumed to be in a "basket" with a gap between the basket and the vessel wall, and an empty space in the center of the reactor. The bed volume was assumed to be the same as the catalyst bed volume for the axial flow reactor. The liquid flow (i.e., feedstock for the hydroprocessing reaction) in the radial flow model was still provided to the top of the catalyst bed and flowed in the axial direction. For convenience in setting up the model, the vapor (i.e., reactive and/or inert gasses) entered the bed via the gap between the vessel wall and the catalyst bed. The width of the gap was set to 0.25 ft (76 mm). The vapor product and possibly some liquid product was assumed to leave the reactor via the open space in the center. The diameter of the open space in the center was set to 4 ft (1.2 m).

In order to calculate the mixed-phase pressure drop, the liquid in the catalyst bed was assumed to be a stagnant liquid. The pressure drop was determined by the vapor flow through the space available for flow, which was assumed to the void space minus the volume lost to liquid holdup. These assumptions allowed for the use of a pressure drop model calculation for determining the pressure drop for both axial vapor flow and radial vapor flow. Any convenient pressure drop model suitable for calculating the pressure drop of a trickle bed reactor can be used.

When calculating the pressure drop for radial vapor flow, because the flow was passing from the outer gap to the inner volume, the flow area decreased as the vapor approached the inner volume. In the radial flow calculation, an effective average flow area was used. The effective average flow area was calculated as $A=(d_1-d_2)/[\ln(d_1/d_2)*\pi*L]$, where $d_1$ is the outer diameter of the catalyst bed, $d_2$ is the inner diameter of the catalyst bed or equivalently the diameter of the inner open volume, and L is the length of the catalyst bed in the axial flow direction.

Table 2 shows the predicted pressure drop for both axial vapor flow and radial vapor flow. Note that for the radial flow calculation, the apparent bed length is only 2.5 ft (0.76 m). This is due to the fact that the vapor flow only has to travel from the outer edge of the catalyst bed to the inner edge.

TABLE 2

| | | Cocurrent downflow | Cross-flow |
| --- | --- | --- | --- |
| Bed length for delta p | ft | 40 | 2.5 |
| Diameter of effective flow area | ft | 9.5 | 37.0 |
| Predicted pressure drop | psi | 15.5 | 0.03 |

As shown in Table 2, the predicted pressure drop for the reactor during co-current axial flow is 15.5 psi. By contrast, due to the shorter flow path length during radial flow operation, the predicted pressure drop for the radial flow configuration is only 0.03 psi.

Due to the reduced pressure drop for a reactor with a radial flow of reactive gas, some processes that are unstable for axial flow reactors can be performed. For example, when a process is performed in a co-current axial flow reactor with a low gas to liquid ratio, the flow of gas and liquid in the catalyst bed may end up in the continuous bubble flow regime. This typically leads to flow maldistribution, resulting in local zones of treat gas or reactive gas starvation. By contrast, due to the low pressure drop and short radial bed length in a radial flow configuration, a substantially homogenous treat gas flow can be maintained in a process with a low gas to liquid ratio. For example, some hydroprocessing reactions provide hydrogen to the reaction by saturating a recycled product stream with hydrogen. By using a saturated recycle stream, the need to dissolve hydrogen in the feedstock is reduced. This can lead to a corresponding reduction in the amount of gas phase hydrogen that needs to be delivered to a process, as most of the required hydrogen is already dissolved in the recycled product stream. In this type of reaction, the hydrogen flow rate may not be sufficient to maintain a desired flow distribution for an axial co-current reactor configuration. However, the likelihood and/or amount of flow maldistribution is typically proportional to the length of a catalyst bed. Due to the shorter gas flow path length in a radial flow configuration, the likelihood and/or amount of flow maldistribution would be expected to be much lower.

Example

Radial Gas Flow in Stacked Catalyst Beds

Figure 8:
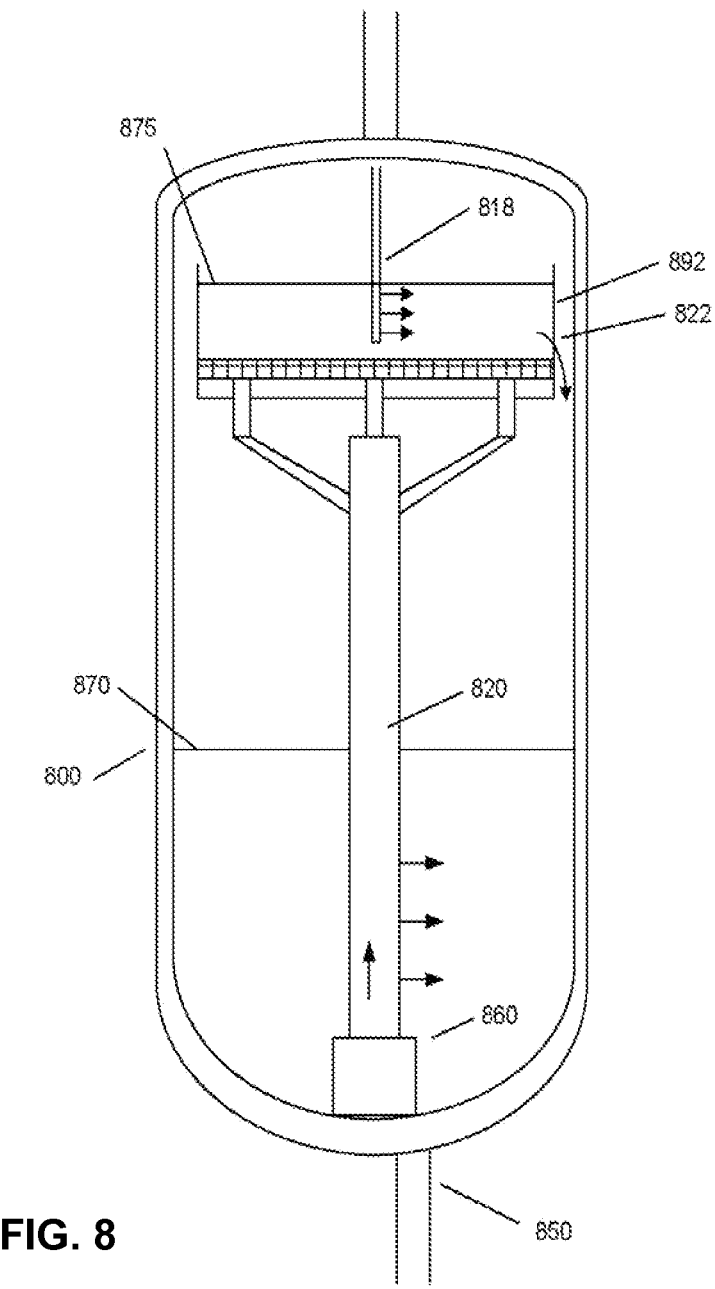
FIG. 8 schematically shows a configuration for delivering a radial gas flow to multiple catalyst beds in a reactor.

One potential configuration for providing radial gas flows to multiple catalyst beds is to use a bed supported by a center support pipe. FIG. 8 shows an example of this type of configuration in a reactor 800. In FIG. 8, a first catalyst bed 875 is supported by a center support pipe 820. An inner conduit 818 extends down from the top of the reactor to provide a radial gas flow into catalyst bed 875. At least a portion of the radial gas flow exits catalyst bed 875 and into outer gap 822 by passing through membrane structure 892. The portion of the gas flow exiting via outer gap 822 flows down into a volume above second catalyst bed 870. The center support pipe 820 occupies a volume within second catalyst bed 870. Catalyst bed 870 extends all of the way to the wall of reactor 800. The gas exiting the first catalyst bed 875 serves as a co-current axial gas flow for second catalyst bed 870. Additional radial gas flow can be delivered into second catalyst bed 870 be using the center support pipe 820 as an inner conduit for the second catalyst bed. In the example shown in FIG. 8, a flow of gas is introduced that flow upward (counter-current) with center support pipe 815 before being radially distributed in bed 870. All of the gas and liquid effluent from reaction with the two catalyst beds can then exit reactor 800 by passing through collector support 860 to exit conduit 850.

In a configuration such as the configuration in FIG. 8, at least a portion of the effluent from exposing a feedstock to the catalyst in the first catalyst bed becomes the input or feedstock for the second catalyst bed, typically after passing through some type of liquid distributor tray to improve flow distribution. Optionally, a separation can be performed between the first and second beds to remove a portion of the gasses in the effluent from the first bed. This can reduce the amount of contaminants present during processing in the second catalyst bed. For example, the liquid effluent from the first catalyst bed can be used as the feedstock for the second catalyst bed, with the radial gas flow from the center support pipe serving as the reactive gas flow for the reaction.

Additional Embodiments

Embodiment 1

A method for performing a catalyzed gas-liquid reaction, comprising:

providing a first catalyst bed in a reactor, the reactor including an inner conduit that occupies a portion of the volume of the first catalyst bed and an outer gap between the first catalyst bed and a wall of the reactor, wherein the reactor further comprises a reactor effluent outlet which is fluidly connected to the first catalyst bed;

exposing an axial flow of a hydrocarbon feedstock to a first catalyst located in the first catalyst bed in the presence of a reactive gas under effective processing conditions to produce a first liquid reaction effluent; and delivering at least a portion of the reactive gas flow into the first catalyst bed via the inner conduit as a radial flow, thereby contacting the hydrocarbon feedstock and the first catalyst in the first catalyst bed under first effective processing conditions;

wherein at least about 50 vol % of the reactive gas flow exits the first catalyst bed by passing into the outer gap, and at least 50 vol % of the first liquid reaction effluent exits the reactor via the reactor effluent outlet.

Embodiment 2

A method for performing a catalyzed gas-liquid reaction, comprising:

providing a first catalyst bed in a reactor, the reactor including an inner conduit that occupies a portion of the volume of the catalyst bed and an outer gap between the first catalyst bed and a wall of the reactor, wherein the reactor further comprises a reactor effluent outlet which is fluidly connected to the first catalyst bed;

exposing an axial flow of a hydrocarbon feedstock to a first catalyst located in the first catalyst bed under first effective processing conditions to produce a first liquid reaction effluent; and delivering at least a portion of a reactive gas flow into the first catalyst bed via the outer gap as a radial flow, thereby contacting for the hydrocarbon feedstock and the first catalyst in the first catalyst bed under first effective processing conditions;

wherein at least about 50 vol % of the reactive gas flow exits the first catalyst bed by passing into the inner conduit, and at least 50 vol % of the first liquid reaction effluent exits the reactor via the reactor effluent outlet.

Embodiment 3

The method of embodiment 1, further comprising:

providing a second catalyst bed in the reactor, the second catalyst bed being at least partially supported by the inner conduit; and exposing an axial flow of at least a portion of the first liquid reaction effluent to a second catalyst located in the second catalyst bed in the presence of the reactive gas under second effective processing conditions to produce a second liquid reaction effluent, delivering at least a portion of the reactive gas flow into the second catalyst bed via the inner conduit as a radial flow, thereby contacting the second liquid reaction effluent and the second catalyst in the second catalyst bed under second effective processing conditions, wherein at least about 50 vol % of the reactive gas flow delivered to the second catalyst bed exits the second catalyst bed by passing into the outer gap, and at least 50 vol % of the second liquid reaction effluent exits the reactor via the reactor effluent outlet, wherein the at least 50 vol % of the first liquid reaction effluent is a component of the at least 50 vol % of the second liquid reaction effluent that exits the reactor via the reactor effluent outlet.

Embodiment 4

The method of embodiment 3, wherein at least a portion of the reactive gas flow delivered to the second catalyst bed is delivered as a radial gas flow.

Embodiment 5

The method of any one of embodiments 3-4, wherein at least about 50% of the reactive gas flow delivered to the second catalyst bed exits the second catalyst bed by passing into an outer gap through a gas/liquid selective membrane structure that separates second catalyst in the second catalyst bed from the outer gap.

Embodiment 6

The method of any one of embodiments 3-5, wherein the second catalyst is a hydrotreating catalyst and the first catalyst is a hydrocracking catalyst or a dewaxing catalyst.

Embodiment 7

The method of any one of embodiments 3-6, wherein at least 90 vol % of the second liquid reaction effluent exits the reactor via the reactor effluent outlet.

Embodiment 8

The method of any one of embodiments 3-7, wherein substantially all of the second liquid reaction effluent exits the reactor via the reactor effluent outlet.

Embodiment 9

The method of any one of embodiments 1 and 3-8, wherein passing at least about 50 vol % of the reactive gas flow into the outer gap comprises passing the at least about 50 vol % of the reactive gas flow through a gas/liquid selective membrane structure that separates the first catalyst in the first catalyst bed from the outer gap.

Embodiment 10

The method of embodiment 2, wherein passing at least about 50 vol % of the reactive gas flow into the inner conduit comprises passing the at least about 50 vol % of the reactive gas flow through a gas/liquid selective membrane structure that separates the first catalyst in the first catalyst bed from the inner conduit.

Embodiment 11

The method of any one of embodiments 9-10, wherein the gas/liquid selective membrane structure is comprised of a gas permeable ceramic membrane.

Embodiment 12

The method of any one of embodiments 9-10, wherein the gas/liquid selective membrane structure is comprised of a gas permeable metal membrane.

Embodiment 13

The method of any one of the preceding embodiments, wherein the first effective processing conditions comprise effective hydroprocessing conditions and the reactive gas comprises hydrogen.

Embodiment 14

The method of any one of the preceding embodiments, wherein the reactive gas comprises at least about 80 mol % hydrogen.

Embodiment 15

The method of any one of the preceding embodiments, wherein at least about 25 vol % of the reactive gas is delivered into the first catalyst bed as a radial gas flow.

Embodiment 16

The method of any one of the preceding embodiments, wherein the at least a portion of the reactive gas flow is delivered into the first catalyst bed at a plurality of heights relative to a height of the first catalyst bed.

Embodiment 17

The method of any one of embodiments 1-2 and 9-16, wherein substantially all of the reactive gas flow is delivered into the first catalyst bed as a radial gas flow.

Embodiment 18

The method of any one of embodiments 1-2 and 9-17, wherein at least 90 vol % of the first liquid reaction effluent exits the reactor via the reactor effluent outlet.

Embodiment 19

The method of any one of embodiments 1-2 and 9-18, wherein substantially all of the first liquid reaction effluent exits the reactor via the reactor effluent outlet.

Embodiment 20

The method of any one of the preceding embodiments, wherein the reactor is cylindrical and the axial flow is in a direction parallel with the central axis of the cylinder and the radial flow is in any direction that is perpendicular to the central axis.

Embodiment 21

The method of any one of the preceding embodiments, wherein exposing a hydrocarbon feedstock to a first catalyst under first effective processing conditions comprises exposing the hydrocarbon feedstock to a hydrotreating catalyst under effective hydrotreating conditions, the hydrotreating catalyst comprising at least one Group VI metal and at least one Group VIII metal optionally on a support, the effective hydrotreating conditions including a temperature of about 200° C. to about 450° C., or about 315° C. to about 425° C.; a pressure of about 250 psig (1.8 MPa) to about 5000 psig (34.6 MPa) or about 300 psig (2.1 MPa) to about 3000 psig (20.8 MPa); a Liquid Hourly Space Velocity (LHSV) of about 0.05 to about 10 h$^{-1}$; and a hydrogen treat rate of about 200 scf/B (35.6 m$^3$/m$^3$) to about 10,000 scf/B (1781 m$^3$/m$^3$), or about 500 (89 m$^3$/m$^3$) to about 10,000 scf/B (1781 m$^3$/m$^3$).

Embodiment 22

The method of any one of the preceding embodiments, wherein exposing a hydrocarbon feedstock to a first catalyst under first effective processing conditions comprises exposing the hydrocarbon feedstock to a hydrocracking catalyst under effective hydrocracking conditions, the hydrocracking catalyst comprising at least one Group VI metal and at least one Group VIII metal on an acidic support, the effective hydrocracking conditions comprising a temperature of about 550° F. (288° C.) to about 840° F. (449° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other aspects, the conditions can include temperatures in the range of about 600° F. (343° C.) to about 815° F. (435° C.), hydrogen partial pressures of from about 500 psig to about 3000 psig (3.5 MPag-20.9 MPag), liquid hourly space velocities of from about 0.2 h$^{-1}$ to about 2 h$^{-1}$ and hydrogen treat gas rates of from about 213 m$^3$/m$^3$ to about 1068 m$^3$/m$^3$ (1200 SCF/B to 6000 SCF/B).

Embodiment 23

The method of any one of the preceding embodiments, wherein exposing a hydrocarbon feedstock to a first catalyst under first effective processing conditions comprises exposing the hydrocarbon feedstock to a dewaxing catalyst under effective catalytic dewaxing conditions, including a temperature of about 200° C. to about 450° C., preferably about 270° C. to about 400° C., a hydrogen partial pressure of about 1.8 to about 34.6 mPa (250 to 5000 psi), preferably about 4.8 to about 20.8 mPa, a liquid hourly space velocity of from about 0.2 hr$^{-1}$ to about 10 hr$^{-1}$, preferably about 0.5 hr$^{-1}$ to about 3.0 hr$^{-1}$, and a hydrogen circulation rate of from about 35.6 to about 1781 m$^3$/m$^3$ (200 to 10,000 scf/B), preferably about 178 to about 890.6 m$^3$/m$^3$ (1000 to 5000 scf/B).

What is claimed is:

1. A method for performing a catalyzed gas-liquid reaction, comprising:

providing a first catalyst bed in a reactor, the reactor including an inner conduit that occupies a portion of the volume of the first catalyst bed and an outer gap between the first catalyst bed and a wall of the reactor, wherein the reactor further comprises a reactor effluent outlet which is fluidly connected to the first catalyst bed;

exposing a downward axial flow of a hydrocarbon feedstock to a first catalyst located in the first catalyst bed in the presence of a reactive gas under effective processing conditions to produce a first liquid reaction effluent; and delivering at least a portion of the reactive gas flow into the first catalyst bed via the inner conduit as a radial flow and at least a portion of the reactive gas flows directly into the catalyst bed in a co-current manner with the feedstock, thereby contacting the hydrocarbon feedstock and the first catalyst in the first catalyst bed under first effective processing conditions;

wherein at least about 50 vol % of the reactive gas flow exits the first catalyst bed by passing into the outer gap, and at least 50 vol % of the first liquid reaction effluent exits the reactor via the reactor effluent outlet.

2. The method of claim 1, wherein the first effective processing conditions comprise effective hydroprocessing conditions and the reactive gas comprises hydrogen.

3. The method of claim 1, wherein passing at least about 50 vol % of the reactive gas flow into the outer gap comprises passing the at least about 50 vol % of the reactive gas flow through a gas/liquid selective membrane structure that separates the first catalyst in the first catalyst bed from the outer gap.

4. The method of claim 3, wherein the gas/liquid selective membrane structure is comprised of a gas permeable ceramic membrane.

5. The method of claim 3, wherein the gas/liquid selective membrane structure is comprised of a gas permeable metal membrane.

6. The method of claim 1, wherein at least about 25 vol % of the reactive gas is delivered into the first catalyst bed as a radial gas flow.

7. The method of claim 1, wherein the at least a portion of the reactive gas flow is delivered into the first catalyst bed at a plurality of heights relative to a height of the first catalyst bed.

8. The method of claim 1, wherein substantially all of the reactive gas flow is delivered into the first catalyst bed as a radial gas flow.

9. The method of claim 1, wherein at least 90 vol % of the first liquid reaction effluent exits the reactor via the reactor effluent outlet.

10. The method of claim 9, wherein substantially all of the first liquid reaction effluent exits the reactor via the reactor effluent outlet.

11. The method of claim 1, wherein the reactor is cylindrical and the axial flow is in a direction parallel with the central axis of the cylinder and the radial flow is in any direction that is perpendicular to the central axis.

12. The method of claim 1, wherein exposing a hydrocarbon feedstock to a first catalyst under first effective processing conditions comprises exposing the hydrocarbon feedstock to a hydrotreating catalyst under effective hydrotreating conditions, the hydrotreating catalyst comprising at least one Group VI metal and at least one Group VIII metal optionally on a support, the effective hydrotreating conditions including a temperature of about 200° C. to about 450° C.; a pressure of about 250 psig (1.8 MPa) to about 5000 psig (34.6 MPa); a Liquid Hourly Space Velocity (LHSV) of about 0.05 to about 10 $h^{-1}$; and a hydrogen treat rate of about 200 scf/B (35.6 $m^3/m^3$) to about 10,000 scf/B (1781 $m^3/m^3$).

13. The method of claim 1, wherein exposing a hydrocarbon feedstock to a first catalyst under first effective processing conditions comprises exposing the hydrocarbon feedstock to a hydrocracking catalyst under effective hydrocracking conditions, the hydrocracking catalyst comprising at least one Group VI metal and at least one Group VIII metal on an acidic support, the effective hydrocracking conditions comprising a temperature of about 550° F. (288° C.) to about 840° F. (449° C.), hydrogen partial pressures of from about 250 psig to about 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B).

14. The method of claim 1, wherein exposing a hydrocarbon feedstock to a first catalyst under first effective processing conditions comprises exposing the hydrocarbon feedstock to a dewaxing catalyst under effective catalytic dewaxing conditions, including a temperature of about 200° C. to about 450° C., a hydrogen partial pressure of about 1.8 to about 34.6 mPa (250 to 5000 psi), a liquid hourly space velocity of from about 0.2 $hr^{-1}$ to about 10 $hr^{-1}$, and a hydrogen circulation rate of from about 35.6 to about 1781 $m^3/m^3$ (200 to 10,000 scf/B).

15. The method of claim 1, further comprising:
providing a second catalyst bed in the reactor, the second catalyst bed being at least partially supported by the inner conduit; and
exposing an axial flow of at least a portion of the first liquid reaction effluent to a second catalyst located in the second catalyst bed in the presence of the reactive gas under second effective processing conditions to produce a second liquid reaction effluent,
delivering at least a portion of the reactive gas flow into the second catalyst bed via the inner conduit as a radial flow, thereby contacting the second liquid reaction effluent and the second catalyst in the second catalyst bed under second effective processing conditions,
wherein at least about 50 vol % of the reactive gas flow delivered to the second catalyst bed exits the second catalyst bed by passing into the outer gap, and at least 50 vol % of the second liquid reaction effluent exits the reactor via the reactor effluent outlet, wherein the at least 50 vol % of the first liquid reaction effluent is a component of the at least 50 vol % of the second liquid reaction effluent that exits the reactor via the reactor effluent outlet.

16. The method of claim 15, wherein at least a portion of the reactive gas flow delivered to the second catalyst bed is delivered as a radial gas flow.

17. The method of claim 16, wherein at least about 50% of the reactive gas flow delivered to the second catalyst bed exits the second catalyst bed by passing into an outer gap through a gas/liquid selective membrane structure that separates second catalyst in the second catalyst bed from the outer gap.

18. The method of claim 17, wherein the gas/liquid selective membrane structure is comprised of a gas permeable ceramic membrane.

19. The method of claim 17, wherein the gas/liquid selective membrane structure is comprised of a gas permeable metal membrane.

20. The method of claim 15, wherein the second catalyst is a hydrotreating catalyst and the first catalyst is a hydrocracking catalyst or a dewaxing catalyst.

21. The method of claim 15, wherein at least 90 vol % of the second liquid reaction effluent exits the reactor via the reactor effluent outlet.

22. The method of claim 21, wherein substantially all of the second liquid reaction effluent exits the reactor via the reactor effluent outlet.

23. The method of claim 15, wherein passing at least about 50 vol % of the reactive gas flow into the inner conduit comprises passing the at least about 50 vol % of the reactive gas flow through a gas/liquid selective membrane structure that separates the first catalyst in the first catalyst bed from the inner conduit.

24. The method of claim 23, wherein the gas/liquid selective membrane is a gas permeable ceramic membrane.

25. The method of claim 23, wherein the gas/liquid selective membrane is a gas permeable metal membrane.

26. The method of claim 15, wherein at least 90 vol % of the first liquid reaction effluent exits the reactor via the reactor effluent outlet.

27. The method of claim 26, wherein substantially all of the first liquid reaction effluent exits the reactor via the reactor effluent outlet.

28. A method for performing a catalyzed gas-liquid reaction, comprising:
providing a first catalyst bed in a reactor, the reactor including an inner conduit that occupies a portion of the volume of the catalyst bed and an outer gap between the first catalyst bed and a wall of the reactor, wherein the reactor further comprises a reactor effluent outlet which is fluidly connected to the first catalyst bed;

exposing an axial flow of a hydrocarbon feedstock to a first catalyst located in the first catalyst bed under first effective processing conditions to produce a first liquid reaction effluent; and delivering at least a portion of a reactive gas flow into the first catalyst bed via the outer gap as a radial flow and at least a portion of the reactive gas flows directly into the catalyst bed in a co-current manner with the feedstock, thereby contacting for the hydrocarbon feedstock and the first catalyst in the first catalyst bed under first effective processing conditions;

wherein at least about 50 vol % of the reactive gas flow exits the first catalyst bed by passing into the inner conduit, and at least 50 vol % of the first liquid reaction effluent exits the reactor via the reactor effluent outlet.

29. The method of claim 28, wherein the first effective processing conditions comprise effective hydroprocessing conditions and the reactive gas comprises hydrogen.

30. The method of claim 28, wherein the reactive gas comprises at least about 80 mol % hydrogen.

31. The method of claim 28, wherein at least about 25 vol % of the reactive gas flow is delivered into the first catalyst bed as a radial gas flow.

\* \* \* \* \*